United States Patent [19]

Gannett et al.

[11] Patent Number: 4,485,140

[45] Date of Patent: Nov. 27, 1984

[54] MELT-FUSIBLE POLYIMIDES

[75] Inventors: Thomas P. Gannett; Hugh H. Gibbs; Robert J. Kassal, all of Wilmington, Del.

[73] Assignee: E. I. Du Pont de Nemours and Company, Wilmington, Del.

[21] Appl. No.: 574,694

[22] Filed: Jan. 27, 1984

Related U.S. Application Data

[60] Division of Ser. No. 534,208, Sep. 21, 1983, , which is a continuation-in-part of Ser. No. 475,034, Mar. 14, 1983, abandoned.

[51] Int. Cl.$^3$ .................. B32B 27/12; B32B 27/28
[52] U.S. Cl. .................. 428/260; 428/271; 428/272; 428/273; 428/280; 428/290; 428/294; 428/407; 428/408; 428/473.5; 428/698; 428/902; 524/104; 524/173; 524/231; 524/361; 524/378; 524/381; 524/445; 524/447; 528/183; 528/353
[58] Field of Search ............... 528/183, 353; 524/104, 524/173, 231, 361, 378, 381, 445, 449; 428/271, 272, 273, 280, 290, 294, 407, 408, 473.5, 698, 902, 260

[56] References Cited

U.S. PATENT DOCUMENTS

| | | |
|---|---|---|
| 3,234,181 | 2/1966 | Olivier . |
| 3,845,018 | 10/1974 | Bilow et al. . |
| 3,959,350 | 5/1976 | Rogers . |
| 4,017,459 | 4/1977 | Onder . |
| 4,336,175 | 6/1982 | Gibbs . |

OTHER PUBLICATIONS

Sazanov et al., *Visokomolekulyarniye Soedineniya*, (B) 20, 820–824 (1978), No. 11.

Sachindrapal et al., *Makromol. Chem., Rapid Commun.*, 1, 667–670 (1980).

*Primary Examiner*—James C. Cannon
*Attorney, Agent, or Firm*—Paul R. Steyermark

[57] ABSTRACT

Melt-fusible polyimides based on pyromellitic dianhydride and 2,2-bis[3,5-dichloro-4-(4-aminophenoxy)-phenyl]propane, alone or in combination with other defined diamines, are useful in making low-void composites and thermoplastic tapes, which can be fabricated into articles such as, for example, aircraft and autobody panels, printed circuit boards, etc.

25 Claims, No Drawings

MELT-FUSIBLE POLYIMIDES

CROSS REFERENCE TO RELATED APPLICATION

This is a divisional of a copending application Ser. No. 534,208 filed in the names of Thomas Papin Gannett and Hugh Harper Gibbs on Sept. 21, 1983, which was a continuation-in-part of application Ser. No. 475,034 filed Mar. 14, 1983, and now abandoned.

BACKGROUND OF THE INVENTION

This invention relates to certain melt-fusible polyimides, especially to those which can be melt processed without deleterious decomposition.

For the purpose of the present disclosure and claims, the term "melt-fusible" means that the material can be heated without significant decomposition above its glass transition temperature (Tg), if it is amorphous, or above its crystalline melting point (Tm), if it has crystallinity, and coalesced under pressure. The term "melt processible" means that the material can be fabricated by conventional melt processing techniques such as extrusion and injection molding, in which the melt passes through an orifice. While all the polyimides of the present invention are melt-fusible, the melt viscosity of some polyimides may be so high that they will not be readily melt processible. But even those high viscosity materials are capable of being formed into useful void-free articles by other techniques, such as, for example, fusion in situ on a support or in a heated mold under pressure.

Polyimides are condensation type polymers having a repeating unit of the type shown in Formula (A), below:

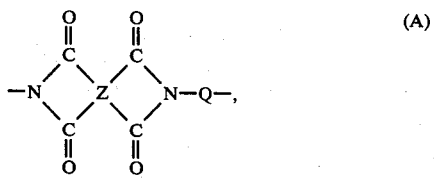

(A)

where Z is a suitable tetravalent organic radical, which may be a simple structure such as that derived from the benzene ring or a more complex structure such as that derived from benzophenone, or any other appropriate, usually aromatic, tetravalent radical; and Q is a divalent organic radical.

One of the important industrial applications of polyimides is as binders for advanced composite materials, especially for use in the aerospace industry; e.g., in aircraft fuselages, wings, flight control surfaces, and missile nose cones, etc. The usual manner of making sheets of composite materials based on polyimides involves impregnation of a fibrous substrate, such as a woven or nonwoven fabric, with a solution of either the polyimide itself or one or more polyimide precursors and then either simply evaporating the solvent or forming a high molecular weight polyimide in situ. Such in situ polyimide formation, which usually is conducted at an elevated temperature, often is referred to as "curing". This expression will be used throughout the present disclosure in the same sense. The polyimide usually is made from the dianhydride of a suitable tetracarboxylic acid in one of two ways, as shown below in equations (1) and (2) for one pathway and (I), (II), and (III) for the other pathway

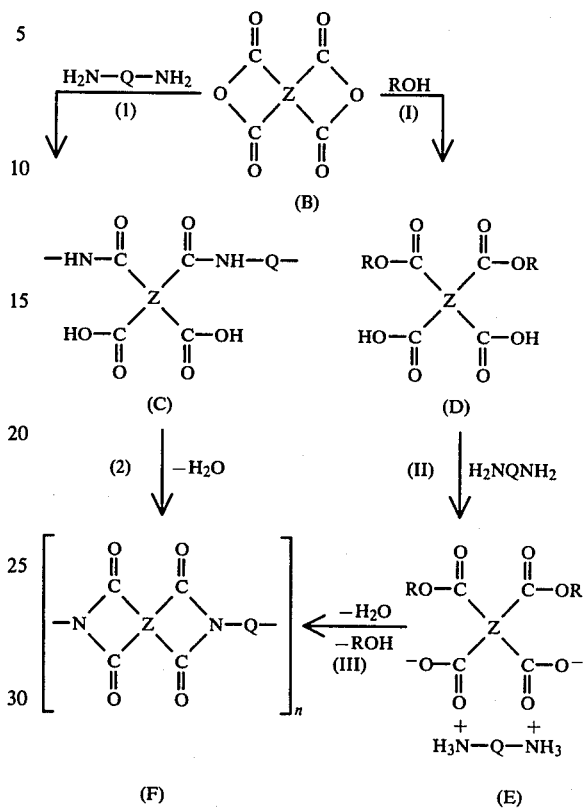

Thus, dianhydride (B) may be first converted by reaction with diamine $H_2NQNH_2$ into polyamide acid (C), which then can be chemically or thermally dehydrated to polyimide (F). Alternatively, dianhydride (B) is first esterified with alcohol ROH (e.g., ethyl alcohol, $R=C_2H_5$) to diester diacid (D), which forms with diamine $H_2NQNH_2$ salt (E). This salt then is thermally cyclized to polyimide (F). Water and, in the appropriate case, alcohol liberated at high temperature are evaporated from the surface of the fibrous composite substrate, and the polyimide remains. The evaporation of reaction solvent, water, and alcohol can cause void formation because of vapor entrapment in the polymer mass. In order to eliminate the voids, it is expedient to compress the freshly made, hot composite to break up the gas bubbles and expel the gases. However, this is possible only when the polyimide can be heated without significant decomposition to a temperature at which it is sufficiently low in viscosity to respond effectively to such a treatment.

The most common place tetracarboxylic acid dianhydride used in the manufacture of polyimides is pyromellitic dianhydride, sometimes hereafter referred to as PMDA, represented by formula (G), below:

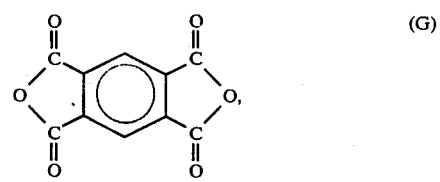

(G)

Another representative dianhydride used for this purpose is 3,3',4,4'-benzophenonetetracarboxylic acid dianhydride (BTDA), formula (H), below:

(H)
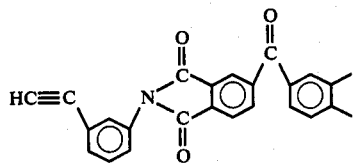

A tetracarboxylic acid, 2,2-bis(3,4-dicarboxyphenyl)-hexafluoropropane, formula (I), below, has been used in some polyimides, (I)
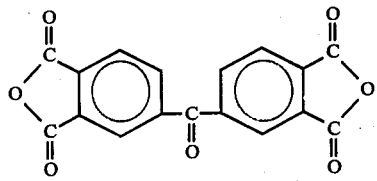

which were made from the tetracarboxylic acid, a diamine, and a suitable solvent in one step by heating the well mixed ingredients to a sufficiently high temperature.

It was known in the past that the usual all aromatic PMDA-based polyimides were not melt-fusible because their crystalline melting points were well above the onset of thermal decomposition, which is about 450° C. A crystalline, high molecular weight, infusible polyimide was formed with such diamines as m-phenylenediamine, p-phenylenediamine, 4,4'-oxydianiline (J), and 1,3-bis(4-aminophenoxy)benzene (K).

(J)
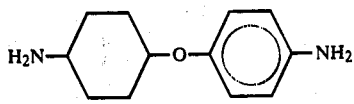

(K)
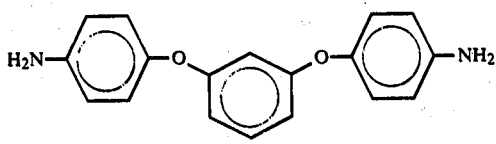

Fiber reinforced laminates based on the usual polyimides made from precursor solutions involving BTDA, formula (H), would normally have a high void content, which would not be readily eliminated because of crosslinking reactions of ketone carbonyl groups with amino groups. Because of this porosity, both the mechanical properties and the long term thermal-oxidative stability of the polyimides were adversely affected. A commercial product developed by Hughes Aircraft Company and sold under the name "Thermid" 600, could, however, be processed to a low void product. The uncured low molecular weight acetylene end-capped oligomer (formula L) could be converted to a high molecular weight product without the evolution of volatile byproducts by means of the acetylene end-group coupling reactions.

(L)
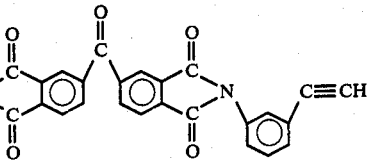

In spite of this advantage over other BTDA-based polyimides, this product was brittle and had low thermal-oxidative stability.

Polyimides based on the tetracarboxylic acid (I) could be processed to a low void product, which had excellent physical properties. However, the starting tetracarboxylic acid is quite expensive.

Polyimides based on PMDA and 2,2-bis[4-(4-aminophenoxy)phenyl]propane (M)

(M)
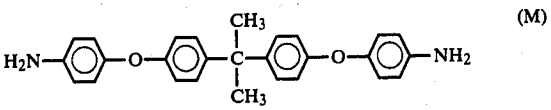

have been reported independently by Sachindrapal et al., *Makromol. Chem., Rapid Comm.* 1, 667–670 (1980), and by Sazanov et al. *Vysokomol. Soedin.*, (B), 20, 820–824 (1978), No. 11.

Polyimides based on the hexafluoroisopropylidene analog of diamine M and various dianhydrides also are disclosed in U.S. Pat. No. 4,111,906 to Jones et al. (TRW, Inc.), and preparation of two such polyimides is described in the examples. However, neither the above two publications nor the patent suggest the melt fusibility of any of the polyimides.

It thus appears very desirable to be able to produce polyimides based on pyromellitic dianhydride (or on pyromellitic acid), which would be melt-fusible, would have sufficiently low viscosity below their decomposition temperature to permit efficient working, especially removal of gas and voids, would have good physical properties in their cured form, and would have good oxidative stability.

SUMMARY OF THE INVENTION

According to the present invention, there is now provided a class of fusible polyimides, which have at least one type of repeating unit (N), below:

(N)
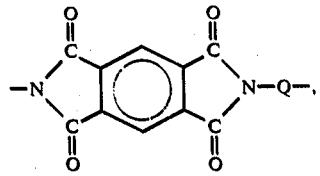

where Q is a divalent organic radical selected from the following,

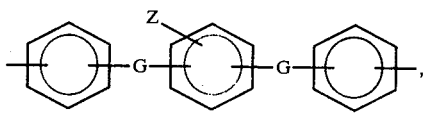

where G is O or S; and Z is hydrogen or phenyl; and, when Z is hydrogen, both terminal covalent bonds are either in the ortho or meta position with respect to G; while, when Z is phenyl, both terminal covalent bonds are bonds are in ortho, meta, or para position with respect to G;

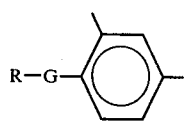

where G is O or S; and R is phenyl, biphenyl, or naphthyl;

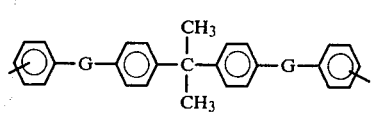

where G is O or S, and both terminal covalent bonds are in the ortho or meta position with respect to G; and

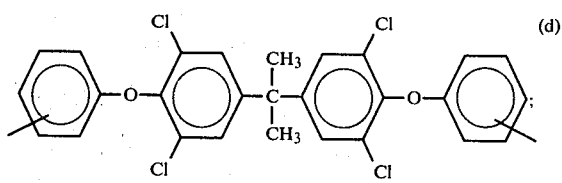

with the proviso that Q in at least some repeating units has the above formula (d).

Further, there are provided polyimide precursor solution compositions, which can be processed to give the same polyimides.

There also are provided composite materials based on a fibrous substrate impregnated with a polyimide of the above formula (N), wherein Q can be any of (a), (b), (c), or (d), above, or the following structure (e):

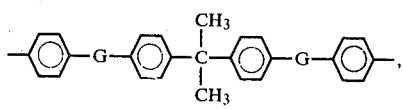

where G is O or S; provided that Q in at least some repeating units has the above formula (d).

DETAILED DESCRIPTION OF THE INVENTION

All the polyimides of the present invention can be made by the process illustrated by equations (1) and (2), above. In addition, they can be made by the process illustrated by equations (I), (II), and (III), above. It can thus be seen that formula (N), above is derivable from pyromellitic acid and from a diamine $H_2N—Q—NH_2$. For convenience, the repeating unit of the polyimides of this invention will sometimes be defined by reference to $H_2N—Q—NH_2$, rather than to Q. The acid moiety is supplied either by pyromellitic dianhydride or by a diester of pyromellitic acid, e.g., the 1,5-diethyl or the 1,5-dimethyl ester. The diamine $H_2N—Q—NH_2$ is one where Q belongs to class (d), either alone or in combination with one or more of classes (a), (b), or (c), defined in the Summary of the Invention. Typical diamines suitable in the preparation of the polyimides of this invention include the following:

1,3-bis(2-aminophenoxy)benzene;
1,2-bis(3-aminophenoxy)benzene;
1,2-bis(2-aminophenoxy)benzene;
1,4-bis(3-aminophenoxy)benzene;
1,4-bis(2-aminophenoxy)benzene;
1,3-bis(3-aminophenoxy)benzene;
2,4-diaminodiphenyl ether;
2-(2,4-diaminophenoxy)biphenyl;  1-(2,4-diaminophenoxy)naphthalene;
2-(2,4-diaminophenoxy)naphthalene;
4-(2,4diaminophenoxy)biphenyl;
2,2-bis[4-(3-aminophenoxy)phenyl]propane;
2,2-bis[4-(2-aminophenoxy)phenyl]propane;
1,4-bis(4-aminophenoxy)-2-phenylbenzene; in addition to 2,2-bis[3,5-dichloro-4-(4-aminophenoxy)phenyl]propane;

For the preparation of composites 2,2-bis[4-(4-aminophenoxy)phenyl]propane, one of the diamines $N_2N—Q—NH_2$ where Q belongs to class (e) defined in the Summary of the Invention, also can be used.

Certain diamines suitable in the practice of the present invention are available commercially. For example, 2,2-bis[4-(4-aminophenoxy)phenyl]propane is available from Mitsui Toatsu. Other diamines can be made by methods known to organic chemists, for example, coupling a chloronitrobenzene with a dihydroxy aromatic compound and reducing the nitro groups. Many such preparations are described in the technical and patent literature. Instead of a single diamine (d), mixtures of two or more diamines may be used; for example, position isomers of the same diamine (d); or two diamines where Q in the other diamine belongs to the class (a), (b), or (c). In addition, a small proportion of a diamine of the present invention can usually be replaced by another diamine capable by itself of forming melt-fusible polyimides with pyromellitic dianhydride, e.g., an aliphatic diamine.

Various diamines $H_2NQNH_2$, where Q belongs to class (a) defined in the Summary Of The Invention can be made by one of the methods described in Example 6, below, using the following starting materials, available from the indicated commercial suppliers:

| Starting Materials | Availability |
| --- | --- |
| 1,2-dihydroxybenzene | Rhone Poulenc |
| 1,3-dihydroxybenzene | Aldrich Chem. Co. |
| 1,4-dihydroxybenzene | Eastman Chem. Prod. |
| o-dibromobenzene | Aldrich Chem. Co. |
| m-dibromobenzene | Aldrich Chem. Co. |
| p-dibromobenzene | Aldrich Chem. Co. |
| o-chloronitrobenzene | Du Pont |
| p-chloronitrobenzene | Du Pont |
| m-hydroxyaniline | Aldrich Chem. Co. |
| 2-aminothiophenol | Aldrich Chem. Co. |
| 3-aminothiophenol | Aldrich Chem. Co. |
| phenylhydroquinone | Aldrich Chem. Co. |

The particular diamines and the method used (identified by Example number) are listed below:

| Diamine | Method of Example 6 |
| --- | --- |
| 1,2-bis(2-aminophenoxy)benzene | A |
| 1,2-bis(3-aminophenoxy)benzene | B |
| 1,3-bis(2-aminophenoxy)benzene | A |
| 1,3-bis(3-aminophenoxy)benzene | B |
| 1,4-bis(2-aminophenoxy)benzene | A |
| 1,4-bis(3-aminophenoxy)benzene | B |
| 1,2-bis(2-aminophenthio)benzene | B |
| 1,2-bis(3-aminophenthio)benzene | B |
| 1,3-bis(2-aminophenthio)benzene | B |
| 1,3-bis(3-aminophenthio)benzene | B |
| 1,4-bis(2-aminophenthio)benzene | B |
| 1,4-bis(3-aminophenthio)benzene | B |
| 1,4-bis(4-aminophenoxy)-2-phenylbenzene | A |

Diamines $H_2NQNH_2$, where Q belongs to class (b) defined in the Summary of the Invention can be made according to the method of Example 6A, below, from the following starting materials.

| | Availability |
| --- | --- |
| Starting Materials | |
| 1-chloro-2,4-dinitrobenzene | Aldrich Chem. Co. |
| 2-hydroxybiphenyl | Aldrich Chem. Co. |
| 3-hydroxybiphenyl | Pfaltz & Bauer |
| 4-hydroxybiphenyl | Aldrich Chem. Co. |
| 1-hydroxynaphthalene | Aldrich Chem. Co. |
| 2-hydroxynaphthalene | Aldrich Chem. Co. |
| Phenol | several sources |
| Diamines | |
| 2,4-diaminodiphenyl ether | |
| 2-(2,4-diaminophenoxy)biphenyl | |
| 3-(2,4-diaminophenoxy)biphenyl | |
| 4-(2,4-diaminophenoxy)biphenyl | |
| 1-(2,4-diaminophenoxy)naphthalene | |
| 2-(2,4-diaminophenoxy)naphthalene | |

Diamines $H_2NQNH_2$, where Q belongs to class (c) illustrated by a formula in the Summary of the Invention can be made by the method of Example 6A from the following starting material available from the indicated sources:

| | Availability |
| --- | --- |
| Starting Materials | |
| Bisphenol A | Dow Chemical Co. |
| o-chloronitrobenzene | Du Pont |
| m-chloronitrobenzene | Aldrich Chem. Co. |
| Diamines | |
| 2,2-bis[4-(3-aminophenoxy)phenyl]propane | |
| 2,2-bis[4-(2-aminophenoxy)phenyl]propane | |

Diamine $H_2NQNH_2$, where Q belongs to class (d) defined in the Summary of the Invention can be made as described in Example 6(C), below.

Although from the standpoint of producing the highest molecular weight it may be advisable to use the starting dianhydride or diester diacid and diamine in stoichiometric proportions, it may be preferred to use a slight excess, up to about 10% and preferably 1–6%, of one of the reactants to limit molecular weight build-up, thus achieving a better compromise between melt fusibility and mechanical properties. It may be desired to cap the end groups with a suitable monofunctional reagent in order to enhance the melt viscosity stability of the product. Although one can use an excess of either component, it is preferred to use an excess of the diamine, which can be conveniently capped by conversion to the corresponding phthalimide. The end-capping agent thus may be either phthalic anhydride or a phthalic acid ester. When an excess of PMDA or of pyromellitic acid diethyl ester is used, the end groups are capped, for example, with aniline.

While this invention contemplates the use of PMDA or pyromellitic diacid diester, a small proportion of such material may be replaced by another aromatic dianhydride, diacid diester, or tetracarboxylic acid which by itself is capable of forming melt-fusible polyimides with the aromatic diamines of the present invention.

The polycondensation reaction is usually carried out in a solvent. In the preparation of precursor solutions it is practical to keep the total solids concentration at no more than about 70%, preferably 40–65% by weight. Suitable solvents have polar groups, such as alcohol, ether, ketone, amide, or sulfoxide. Preferred solvents are N-methyl-2-pyrrolidone and mixtures of N-methyl-2-pyrrolidone with ethanol. Other suitable solvents include, for example, N,N-dimethylacetamide and diglyme. Starting with PMDA, the first step of the reaction is exothermic, so that no additional heating normally is required, and cooling may be advisable. A polyamide acid is formed, as shown in equation (1), above. Dehydration of this intermediate can be accomplished either by a further treatment with a dehydrating agent, such as acetic anhydride or a mixture of acetic anhydride with pyridine, or by heating to a high temperature either with or without a solvent. Chemical dehydration is preferred for the manufacture of neat polyimide resins, while thermal dehydration is better suited for curing polyimide precursor solutions in situ to form composite structures.

The polyimides of the present invention are melt-fusible, that is, they can be handled in the melt without deleterious decomposition. Their glass transition temperature, Tg, or melting temperature, Tm, depending on whether they are amorphous or crystalline, is below about 450° C. The preferred Tg or Tm range is 180°–400° C. because it covers a wide variety of fabrication processes as well as of useful applications. A good indication of melt fusibility is the ability of the polyimides of the present invention to form a flexible film by compression molding or to be drawn into filaments.

The composite sheets which can be made by impregnating fibrous substrate with polyimide precursor solutions can be based on a number of such substrates, woven, nonwoven, tow, felt, unidirectional continuous fibers, etc. For many applications, such as various aerospace components, carbon fibers and aramid fibers, which produce light and strong composites, are the most preferred. Other fibers include, among others, glass, boron, and asbestos fibers. The polyimide itself may be filled with reinforcing additives, which may be fibrous, as above, or particulate. Particulate fillers include, for example, carbon and graphite powders, mica, silica, clay, and silicon carbide whiskers. Whether one deals with fiber-reinforced or particulate-filled polyimide composition, the product will usually contain about 5 to about 70 volume % of the additive. For particulate-filled compositions, the range is 5–50 volume %, especially 5–25 volume %.

The usual technique for making composites involves a two-step operation. In the first step a fibrous substrate is impregnated with a solution of polyimide precursors in an appropriate solvent, and the impregnated substrate is heated, usually at an elevated temperature, to reduce the volatiles content, usually to about 25 weight % or less, preferably 10–20%. The partly devolatilized, impregnated fibrous substrate, so-called prepreg, is then used to form the final shaped article, either as a single layer but normally as a multilayer structure, and the polyimide is formed in situ by heating the shaped article to a suitable temperature, for example, 350° C. or higher.

Prepregs contain up to about 70 volume % of fibers (on volatiles-free basis), preferably 40–65%.

Impregnation of a fibrous substrate directly with a molten stoichiometric polyimide is usually not practical because of excessively high melt viscosity of the polyimide even at temperatures approaching its decomposition temperature. However, when an end-capped non-stoichiometric polyimide is employed, impregnation of fibrous substrate with such a molten polyimide without decomposition is entirely feasible. Such impregnated structures (sometimes called cured prepregs) are formed into shaped articles with the aid of equipment permitting localized heating to high temperature, so that the cured prepreg is heat-shaped into the final article in one step. Similarly a normal "wet" prepreg can be heated to a high enough temperature to cause both devolatilization and curing and then heat-shaped into the final article.

The polyimides of the present invention can be used in such diverse applications as composite sheets which can be formed into articles such as aircraft and autobody panels, appliance housings, printed circuit boards, and missile parts; films, especially films which must be capable of withstanding high temperatures, such as, for example, wire insulation and flexible circuits; coatings, e.g., electrical cable coatings, especially for high temperature applications such as electric motor windings; generator components; and transformer parts.

This invention is now illustrated by certain representative embodiments thereof, where all parts, proportions, and percentages are by weight, unless otherwise indicated. All the units are those adopted by American National Metric Council, Guied SIG-04 (1978).

Pyromellitic dianhydride is commercially available from Veba Huls of the German Federal Republic; however, pyromellitic dianhydride available internally from Du Pont was used.

N,N-Dimethylacetamide (DMAc), which was used as the solvent in some reactions, was stored over 4A molecular sieves (activated by heating 4 hours at 450° C. in a stream of nitrogen), and before use was filtered through activity I acidic alumina (to remove dimethylamine). Pyridine was dried by distillation from calcium hydride and was stored over activated 4A molecular sieves.

All the inherent viscosity measurements were obtained at a concentration of approximately 0.5 g/100 mL of solution at room temperature. The polyamide acid solutions were diluted to the required concentration with DMAc. The polyimide viscosity determinations were carried out at approximately the same concentrations in 100% sulfuric acid. The inherent viscosity of intermediate polyamide acids was kept within the range of about 0.2–3.0 dL/g.

EXAMPLE 4

Stoichiometric copolyimide preparation; chemical imidization

In a 500 mL resin kettle fitted for mechanical stirring were placed 7.31 g (0.025 mole) of 1,3-bis(3-aminophenoxy)benzene, 10.26 g (0.025 mole) of 2,2-bis[4-(4-aminophenoxy)phenyl]propane, and 160 mL of DMAc. After the diamines had dissolved, the solution was cooled with ice; 10.91 g (0.050 mole) of PMDA was added and rinsed into the kettle with 12 mL of DMAc. After 15 minutes, the ice bath was removed, and the kettle was stirred for 2 hours at room temperature. A small sample (0.297 g) of the solution was removed, dilute with DMAc to 10 mL, and found to have an inherent viscosity of 0.89 dL/g. The remainder of the reaction solution was added dropwise to a refluxing mixture of 100 mL of DMAc, 12 mL of acetic anhydride, and 10 mL of pyridine. Two hours after the completion of the addition the mixture was cooled to room temperature; the precipitated polyimide was isolated by filtration and vacuum dried overnight at 70° C., then dried 3 hours at atmospheric pressure in a stream of nitrogen at 200° C. The dry polyimide had Tm (by DSC) of 369° C., and after melting and resolidifying had a Tg of 257° C. and a Tm of 354° C.

A polyimide was prepared in the same manner from PMDA and 2,2-bis[3,5-dichloro-4-(4-aminophenoxy)phenyl]propane, which diamine was made as described below in Example 6(C). The inherent viscosity of the polyamide acid was 0.53 dL/g. The first Tm was 413° C. and the second Tg was 314° C. A second Tm was not observed.

EXAMPLE 6

Preparation of Starting Diamines (A) 1,3-bis(2-aminophenoxy)benzene

A 2 liter, 3-necked, round bottom flask fitted with a mechanical stirrer and a reflux condenser topped with a nitrogen inlet was charged with 110 g (1.0 mole) of resorcinol, 315 g (2.0 moles) of o-chloronitrobenzene, 305 g (2.2 moles) of potassium carbonate, and 375 mL of DMAc. The mixture was heated at reflux for 4 hours and filtered hot. The filtrate was cooled to room temperature and added to 0.75 liter of methanol. The precipitated 1,3-bis(2-nitrophenoxy)benzene was filtered, washed with methanol, and vacuum dried at 70° C. The yield was 145.3 g (41%).

A mixture of 145.3 g of 1,3-bis(2-nitrophenoxy)benzene, 340 mL of butanol, 9 mL of triethylamine, and 1.7 g of 5% palladium on carbon was heated to 70° C. in a 1.0 liter stainless steel stirred autoclave and pressurized with hydrogen to 4.1 MPa. This pressure was maintained for 1 hour after the hydrogen uptake had ceased. The autoclave was cooled to room temperature and discharged. The product slurry redissolved on reheating; the solution was filtered through diatomaceous earth to remove the catalyst, cooled to room temperature, and the product precipitated with hexane. The precipitated product was recovered by filtration and vacuum dried at 70° C. The yield of 1,3-bis(2-aminophenoxy)benzene was 95.2 g (79%).

(B) 1,4-bis(3-aminophenoxy)benzene

A 250 mL, 3-necked, round bottom flask fitted with a mechanical stirrer, a still head, a condenser with a nitrogen inlet on the take-off adapter, and a thermometer was charged with 150 mL of pyridine and 21.8 g (0.20 mole) of m-aminophenol. After the m-aminophenol dissolved, 10.8 g (0.20 mole) of sodium methoxide was added. Methanol, formed in this reaction, was distilled off. When the still head temperature reached 110° C., the still head was replaced with a reflux condenser, and 23.6 g (0.10 mole) of p-dibromobenzene and 0.1 g of cuprous chloride were added. The mixture was heated at reflux at 117° C. for 3 hours; 25 mL of DMAc was added to help dissolve sodium m-aminophenoxide formed in the first step. Refluxing was continued for 19 additional hours; the reaction mixture was then cooled to room temperature, filtered to remove inorganic salts, and poured into water. The resulting aqueous solution was extracted with three 300 mL portions of methylene chloride; the extract was dried over magnesium sulfate, decolorized with active carbon, and filtered through diatomaceous earth. Methylene chloride was vacuum-evaporated, and the liquid residue was poured into stirred concentrated hydrochloric acid. The precipitated dihydrochloride of 1,4-bis(3-aminophenoxy)benzene was filtered, washed with concentrated hydrochloric acid, and dried. It then was dissolved in a minimum amount of water containing a small amout of ascorbic acid as antioxidant. The solution was decolorized with activated carbon, filtered through diatomaceous earth, and neutralized with concentrated ammonium hydroxide. The precipitated product was separated by filtration and vacuum-dried overnight at 65° C. The dry diamine weighed 12.4 g (42% yield). Recrystallization from 35 mL of butanol gave 8.6 g of product melting at 98°–99° C., which was distilled bulb-to-bulb to give 6.5 g of colorless 1,4-bis(3,5-aminophenoxy)benzene melting at 99°–100° C.

(C) 2,2-bis[3,5-dichloro-4-(4-aminophenoxy)phenyl]propane

The dinitro precursor to this diamine was prepared from p-chloronitrobenzene and 4,4'-isopropylidenebis(2,6-dichlorophenol) (Dow Chemical Co.) by refluxing for 6 hours a mixture of 1.0 mole of p-chloronitrobenzene, 0.5 mole of 4,4'-isopropylidenebis(2,6-dichlorophenol), 1.1 mole of potassium carbonate, and 325 mL of DMAc. The reaction mixture was protected from light by covering the exposed surfaces of the reaction vessel with aluminum foil. The product, isolated as in example 6A, was obtained in a yield of 83.9 g (28%).

To avoid reductive dehalogenation, the 2,2-bis[3,5-dichloro-4-(4-nitrophenoxy)phenyl]propane was reduced chemically, rather than catalytically hydrogenated. To a magnetically stirred slurry in a 1-liter Erlenmeyer flask of 53.5 g (0.088 mole) of the dinitro compound and 265 mL of acetic acid warmed to 50°–60° C. there was added a solution of 131 g of (0.58 mole) stannous chloride dihydrate in 132 mL of conc. hydrochloric acid over a 10-minute period. The exothermic reduction raised the temperature to about 100° C., and external heating was stopped. After stirring 1 hr, a chilled solution of 14.0 g (0.35 mole) of sodium hydroxide in 440 mL of water containing 1.0 g of ascorbic acid (antioxidant) was added. Thereafter, every few minutes, 2 g portions of sodium hydroxide were added until an alkaline reaction with pH paper was obtained. The insoluble product, 2,2-bis[3,5-dichloro-4-(4-aminophenoxy)phenyl]propane, was isolated as a white powder by filtration, washing with water containing 0.5 wt % of ascorbic acid, and drying to a constant weight in vacuo at 60° C. Yield, 42.0 g (87%).

We claim:
1. A melt-fusible polyimide consisting essentially of the following repeating units

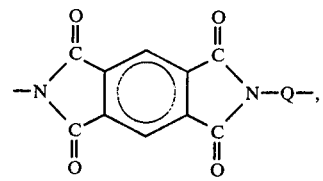

where Q is each repeating unit, independently of any other unit, is a divalent organic radical selected from the following:

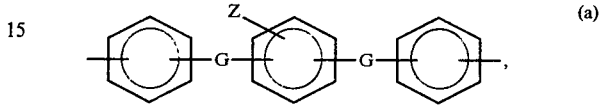

where G is O or S, and Z is hydrogen or phenyl; and, when Z is hydrogen, both terminal covalent bonds are either in the ortho or meta position with respect to G; while, when Z is phenyl, both terminal covalent bonds are in ortho, meta, or para position with respect to G;

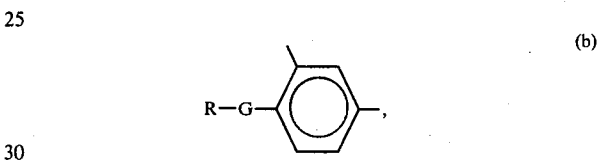

where G is O or S; and R is phenyl, biphenyl, or naphthyl;

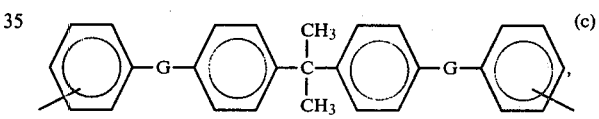

where G is O or S and both terminal covalent bonds are in the ortho or meta position with respect to G; and

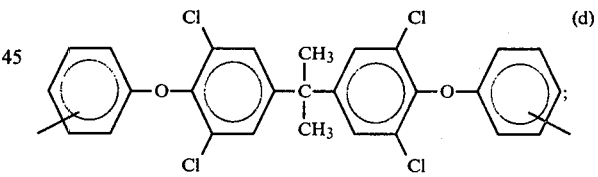

with the proviso that Q in at least some of the repeating units has the above formula (d).

2. A polyimide of claim 1, wherein Q in at least some repeating units is not represented by formula (d) and in those units it is a radical remaining on removal of the amino groups from a diamine $H_2N$—Q—$NH_2$ selected from the group consisting of:
1,3-bis(2-aminophenoxy)benzene,
1,2-bis(3-aminophenoxy)benzene,
1,2-bis(2-aminophenoxy)benzene,
1,4-bis(3-aminophenoxy)benzene,
1,4-bis(2-aminophenoxy)benzene,
1,3-bis(3-aminophenoxy)benzene,
2,4-diaminodiphenyl ether,
1-(2,4-diaminophenoxy)naphthalene,
2-(2,4-diaminophenoxy)naphthalene,
2-(2,4-diaminophenoxy)biphenyl,
4-(2,4-diaminophenoxy)biphenyl, 1,4-bis(4-aminophenoxy)-2-phenylbenzene, and
2,2-bis[4-(2-aminophenoxy)phenyl]propane.

3. A polyimide of claim 2 wherein Q is a radical remaining on removal of the amino groups from a diamine H₂N—Q—NH₂ selected from the group consisting of:
1,3-bis(3-aminophenoxy)benzene,
1,3-bis(2-aminophenoxy)benzene,
1,4-bis(3-aminophenoxy)benzene,
1,4-bis(4-aminophenoxy)-2-phenylbenzene,
2,2-bis[4-(2-aminophenoxy)phenyl]propane, and
2-(2,4-diaminophenoxy)biphenyl.

4. A polyimide of claim 1 which contains an excess of up to 10% of diamine H₂N—Q—NH₂.

5. A polyimide of claim 4 wherein the excess of diamine is end-capped.

6. A polyimide of claim 1 which contains an excess of up to 10% of pyromellitic dianhydride.

7. A polyimide of claim 6 wherein the excess of dianhydride is end-capped.

8. A polyimide composition comprising a polyimide of claim 1 containing a reinforcing additive in fiber or particulate form.

9. A polyimide composition of claim 8, wherein the volume proportion of reinforcing additive is 5-70%.

10. A composition of claim 9 wherein the volume proportion of reinforcing additive is 5-50%.

11. A composition of claim 10 wherein the volume proportion of reinforcing additive is 5-25%.

12. A film of a polyimide of claim 1.

13. A solution in a polar solvent of a pyromellitic diester diacid and of a diamine, either component being present in a 0-10% molar excess, the diamine being either a single species or more than one species selected from the following classes (a) through (d):

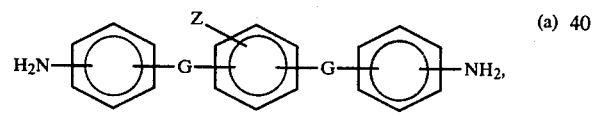
(a)

where G is O or S, and Z is hydrogen or phenyl; and, when Z is hydrogen, both terminal amine groups are either in the ortho or meta position with respect to G; while, when Z is phenyl, both terminal amine groups are in ortho, meta, or para position with respect to G;

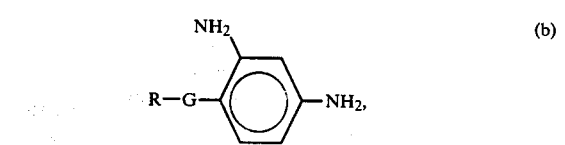
(b)

where G is O or S; and R is phenyl, biphenyl, or naphthyl;

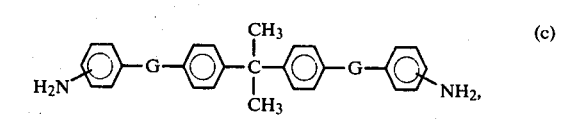
(c)

where G is O or S, and both amine groups are in the ortho or meta position with respect to G; and

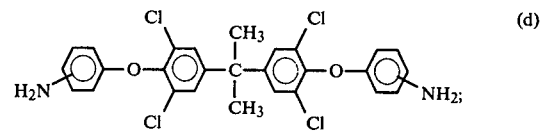
(d)

With the proviso that Q in at least some of the repeating units has the above formula (d).

14. A solution of claim 13 wherein Q in at least some repeating units is not represented by the formula (d) and in those units it is a divalent radical remaining on removal of the amino groups from a diamine H₂N—Q—NH₂ selected from the group consisting of:
1,3-bis(2-aminophenoxy)benzene,
1,2-bis(3-aminophenoxy)benzene,
1,2-bis(2-aminophenoxy)benzene,
1,3-bis(3-aminophenoxy)benzene,
1,4-bis(3-aminophenoxy)benzene,
1,4-bis(2-aminophenoxy)benzene,
2,4-diaminodiphenyl ether,
1-(2,4-diaminophenoxy)naphthalene,
2-(2,4-diaminophenoxy)naphthalene,
2-(2,4-diaminophenoxy)biphenyl,
4-(2,4-diaminophenoxy)biphenyl,
2,2-bis[4-(4-aminophenoxy)phenyl]propane,
2,2-bis[4-(3-aminophenoxy)phenyl]propane,
2,2-bis[4-(2-aminophenoxy)phenyl]propane, and
1,4-bis(4-aminophenoxy)-2-phenylbenzene.

15. A substantially void-free composite structure consisting essentially of a fibrous substrate impregnated with a melt-fusible polyimide containing up to about 10% of end-capped amino or anhydride groups and consisting essentially of the following repeating units:

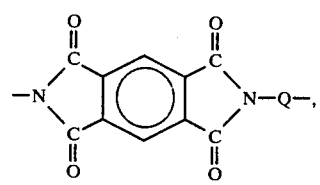

where Q in each repeating unit, independently of any other unit, is a divalent organic radical selected from the following:

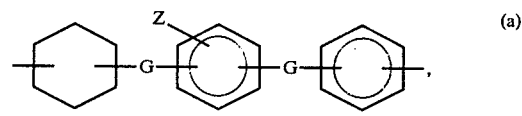
(a)

where G is O or S; and Z is hydrogen or phenyl; and, when Z is hydrogen, both terminal covalent bonds are either in the ortho or meta position with respect to G; while, when Z is phenyl, both terminal covalent bonds are in ortho, meta, or para position with respect to G;

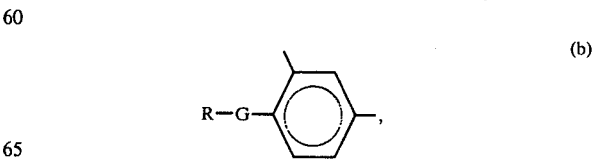
(b)

where G is O or S; and R is phenyl, biphenyl, or naphthyl;

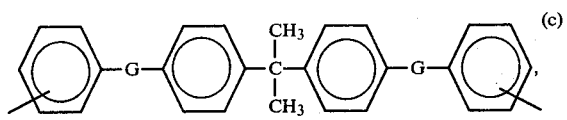

Where G is O or S; and

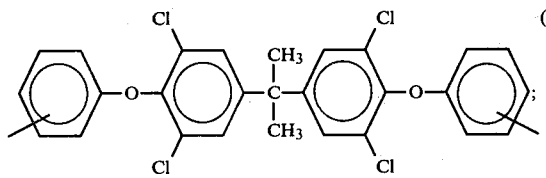

with the proviso that Q in at least some of the repeating units has the above formula (d).

16. A composite of claim 15 wherein Q in at least some repeating units is not represented by formula (d) and in those units it is a divalent radical remaining on removal of the amino groups from the diamine: H₂N—Q—NH₂ selected from the group consisting of:
1,3-bis(2-aminophenoxy)benzene,
1,2-bis(3-aminophenoxy)benzene,
1,2-bis(2-aminophenoxy)benzene,
1,3-bis(3-aminophenoxy)benzene,
1,4-bis(3-aminophenoxy)benzene,
1,4-bis(2-aminophenoxy)benzene,
2,4-diaminodiphenyl ether,
1-(2,4-diaminophenoxy)naphthalene,
2-(2,4-diaminophenoxy)naphthalene,
2-(2,4-diaminophenoxy)biphenyl,
4-(2,4-diaminophenoxy)biphenyl,
2,2-bis[4-(4-aminophenoxy)phenyl]propane,
1,4-bis(4-aminophenoxy)-2-phenylbenzene,
2,2-bis[4-(2-aminophenoxy)phenyl]propane, and
2,2-bis[4-(3-aminophenoxy)phenyl]propane.

17. A composite of claim 16 wherein H₂N—Q—NH₂ is selected from the group consisting of:
1,3-bis(3-aminophenoxy)benzene,
1,3-bis(2-aminophenoxy)benzene,
1,4-bis(3-aminophenoxy)benzene,
1,4-bis(4-aminophenoxy)-2-phenylbenzene,
2,2-bis[4-aminophenoxy)phenyl]propane, and
2-(2,4-diaminophenoxy)biphenyl.

18. A composite structure which is a substantially void-free prepreg consisting essentially of a fibrous substrate impregnated with a concentrated solution of a polyamide acid, which is a precursor of a melt-fusible polyimide, the volatiles content of the prepreg being at most about 25% of its total weight, the melt-fusible polyimide which can be obtained by heating the precursor to a sufficiently high temperature consisting essentially of the following repeating units:

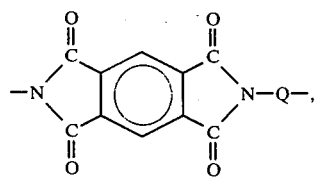

where Q in each repeating unit, independently of any other unit, is a divalent organic radical selected from the following:

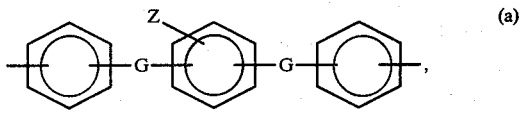

where G is O or S, and Z is hydrogen or phenyl; and, when Z is hydrogen, both terminal covalent bonds are either in the ortho or meta position with respect to G; while, when Z is phenyl, both terminal covalent bonds are in ortho, meta, or para position with respect to G;

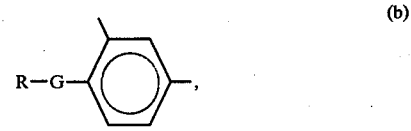

where G is O or S; and R is phenyl, biphenyl, or naphthyl;

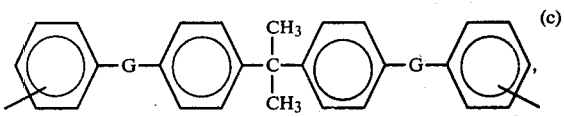

where G is O or S; and

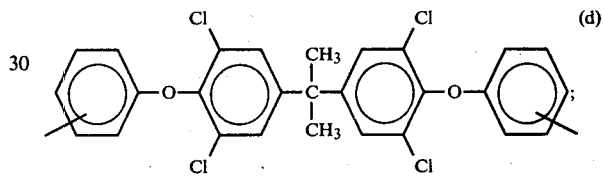

with the proviso that Q in at least some of the repeating units has the above formula (d).

19. A prepreg of claim 18, wherein Q in at least some repeating units is a divalent radical remaining on removal of tha amino groups from a diamine H₂N—Q—NH₂ selected from the group consisting of:
1,3-bis(2-aminophenoxy)benzene,
1,2-bis(3-aminophenoxy)benzene,
1,2-bis(2-aminophenoxy)benzene,
1,3-bis(3-aminophenoxy)benzene,
1,4-bis(3-aminophenoxy)benzene,
1,4-bis(2-aminophenoxy)benzene,
2,4-diaminodiphenyl ether,
1-(2,4-diaminophenoxy)naphthalene,
2-(2,4-diaminophenoxy)naphthalene,
2-(2,4-diaminophenoxy)biphenyl,
4-(2,4-diaminophenoxy)biphenyl,
2,2-bis[4-(4-aminophenoxy)phenyl]propane,
2,2-bis[4-(3-aminophenoxy)phenyl]propane,
2,2-bis[4-(2-aminophenoxy)phenyl]propane, and
1,4-bis(4-aminophenoxy)-2-phenyl benzene.

20. A composite structure selected from the composites of claim 15 and prepregs of claim 18, wherein the fibrous substrate in a preformed woven, non-woven, or felted material.

21. A composite structure of claim 20 wherein the fibrous substrate is in the form of unidirectional continuous fibers.

22. A composite structure of claim 21, wherein the fibrous substrate is selected from the group consisting of carbon, aramid, glass, boron, and asbestos fibers.

23. A composite structure of claim 21, wherein the fiber content is about 40–65 volume percent.

24. A composite structure of claim 21 which is in tape form.

25. A shaped article formed from any of the composite structures of claim 21.

* * * * *